(12) United States Patent
Norkaitis

(10) Patent No.: US 10,971,026 B1
(45) Date of Patent: Apr. 6, 2021

(54) METHOD FOR INTEGRATING EDUCATIONAL LEARNING INTO ENTERTAINMENT MEDIA

(71) Applicant: Matthew B. Norkaitis, Irvine, CA (US)

(72) Inventor: Matthew B. Norkaitis, Irvine, CA (US)

( * ) Notice: Subject to any disclaimer, the term of this patent is extended or adjusted under 35 U.S.C. 154(b) by 213 days.

(21) Appl. No.: 15/714,942

(22) Filed: Sep. 25, 2017

Related U.S. Application Data

(63) Continuation-in-part of application No. 14/736,008, filed on Jun. 10, 2015, now abandoned.

(60) Provisional application No. 62/013,348, filed on Jun. 17, 2014.

(51) Int. Cl.
   *G09B 7/08* (2006.01)
   *A63F 13/533* (2014.01)
   *A63F 13/85* (2014.01)

(52) U.S. Cl.
   CPC .............. *G09B 7/08* (2013.01); *A63F 13/533* (2014.09); *A63F 13/85* (2014.09)

(58) Field of Classification Search
   CPC .... G09B 7/00; G09B 7/08; G09G 5/14; G06F 3/0481
   See application file for complete search history.

(56) References Cited

U.S. PATENT DOCUMENTS

| | | | |
|---|---|---|---|
| 5,716,273 | A | 2/1998 | Yuen |
| 6,024,572 | A | 2/2000 | Weyer |
| 6,769,918 | B1 | 8/2004 | God |
| 7,632,101 | B2 | 12/2009 | Braunberger et al. |
| 8,442,423 | B1 | 5/2013 | Ryan et al. |
| 2003/0008267 | A1 | 1/2003 | Boon |
| 2004/0241633 | A1 | 12/2004 | Drozda |
| 2007/0101287 | A1 | 5/2007 | Pagan |
| 2008/0182232 | A1 | 7/2008 | Bannwolf et al. |
| 2009/0202968 | A1 | 8/2009 | Falcon |
| 2009/0226870 | A1 | 9/2009 | Minotti |
| 2010/0313129 | A1 | 12/2010 | Hyman |
| 2012/0237916 | A1 | 9/2012 | Fujita |

*Primary Examiner* — Peter R Egloff
(74) *Attorney, Agent, or Firm* — Myers Andras LLP; Joseph C. Andras

(57) ABSTRACT

Disclosed is computer-implemented method of integrating educational learning with ongoing entertainment media via a semi-transparent overlay containing an educational question. In the preferred embodiment, the overlay contains an succession of educational questions that are presented in an unimportant area of the ongoing entertainment media and then over time, if the student incorrectly answers the question or does not try to answer it, moves to an important area of the entertainment media. A software hooking technique is employed to effectively integrate the educational questions into the entertainment media where both programs are separately executed such that the underlying media can be interacted with at all times and continues running at all times while the educational overlay changes location and/or other display state.

14 Claims, 11 Drawing Sheets

Moves to Important Area

Grows in Size
Decreases in Transparency

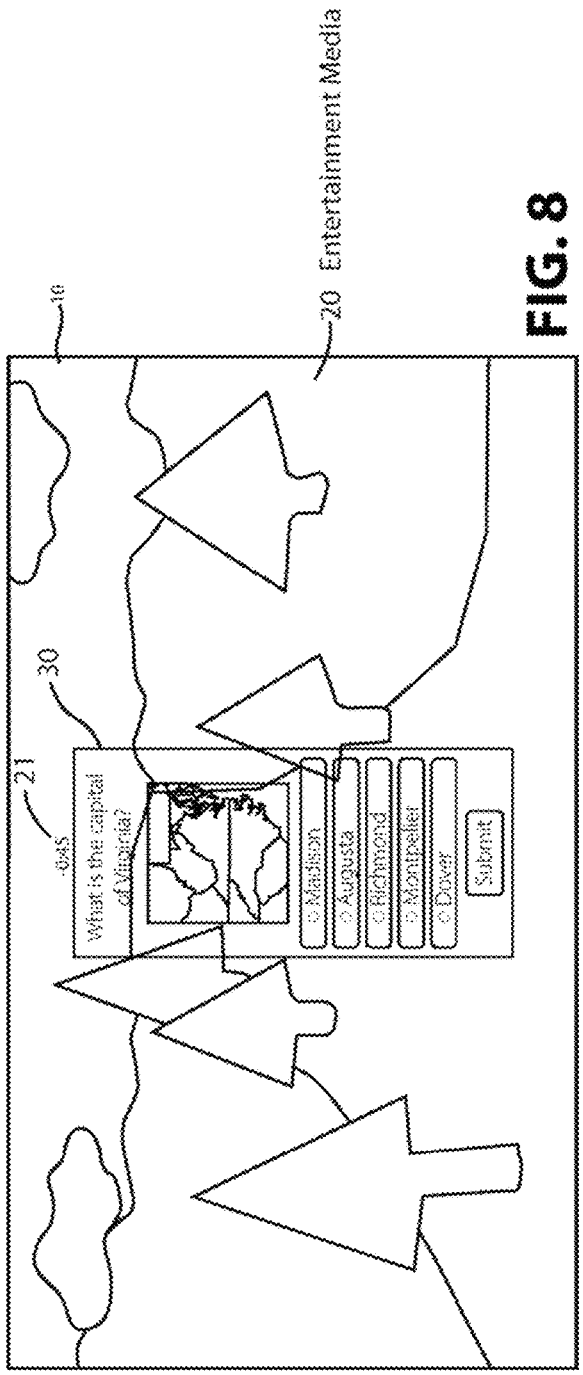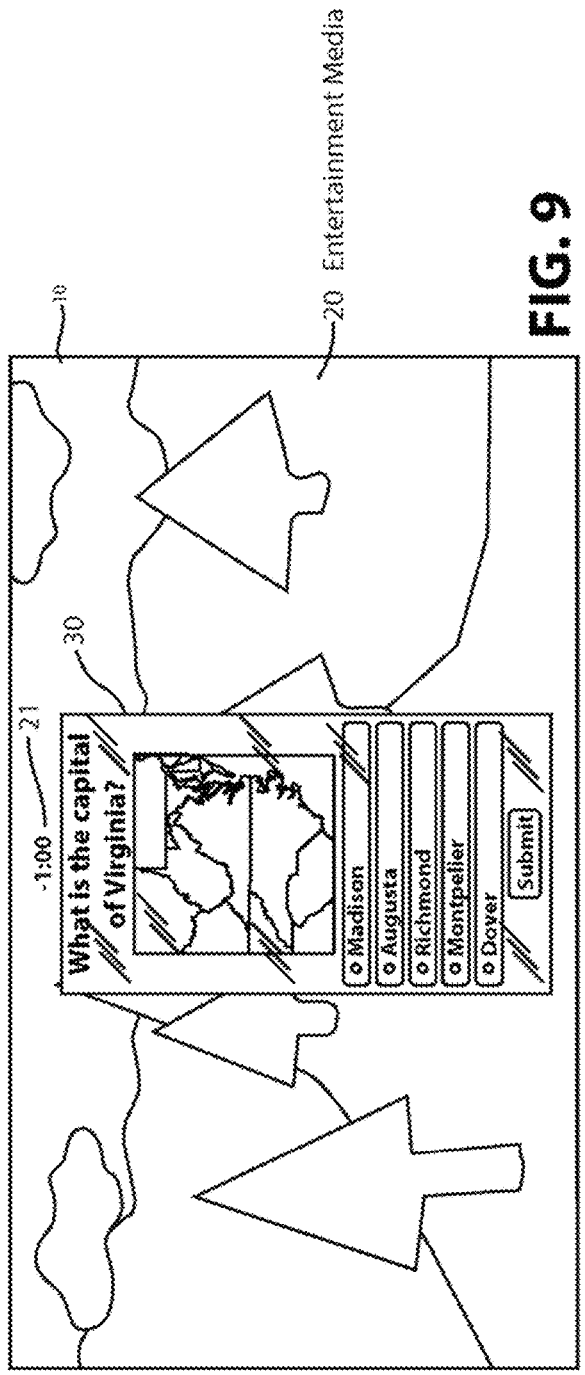

METHOD FOR INTEGRATING EDUCATIONAL LEARNING INTO ENTERTAINMENT MEDIA

RELATED APPLICATION INFORMATION

The present application is a continuation-in-part of U.S. patent application Ser. No. 14/736,008 entitled "METHOD FOR INTEGRATING EDUCATIONAL LEARNING INTO ENTERTAINMENT MEDIA" filed on Jun. 10, 2015, which claims the benefit of U.S. Provisional Patent Application No. 62/013,348, filed on Jun. 17, 2014, the disclosures of which are incorporated herein by reference in their entirety.

BACKGROUND OF THE INVENTION

1. Field of the Invention

This invention generally relates to integrating educational learning with entertainment media.

2. Description of the Related Art

People are spending more time than ever before enjoying entertainment media on their computer driven devices such as general purpose computers, smart TVs, smart phones, tablets, etc. Examples of entertainment media occupying people's time include, but are not limited to, video games, web browsing, social media, videos, movies, TV, and more, i.e. any media that the user deems entertaining.

In an average family with students, the students want to enjoy entertainment activities, video games, social media, movies, etc, and, in principle, most parents have little or no problem with this because they want their children to enjoy themselves, i.e. to simply have fun. Moreover, students are often spending a large percentage of their day with entertainment media, sometimes many hours per day.

While students might be involved in a stimulating task while enjoying their entertainment, much of the time there is no academic learning taking place, i.e. no learning beyond that offered by the entertainment itself. This creates a dilemma, therefore, because the time spent "playing games" or "surfing the web" is often viewed as wasteful from an educational perspective.

In the context of game play or viewing programs on a television, Yuen (U.S. Pat. No. 5,716,273) discloses a switch-like system that interrupts game play or ordinary television viewing by switching between "amusement" material and "educational" material being delivered to the input of a television. The amusement is interrupted and then educational material is displayed. While well intended, the Yuen system placed a decidedly negative connotation on the educational material, the educational material bringing the enjoyment of the entertainment to a complete stop. Likewise, it has been proven that students learn much better when they are "enjoying themselves" and are currently "engaged in something exciting," and associate the educational material with this experience. In the Yuen system this "enjoying themselves" and currently "engaged in something exciting" experience is clearly broken when the entertainment is brought to a complete stop. The fact that students learn better when "enjoying themselves" and currently "engaged in something exciting" are two of the eight principles of the "laws of learning." These are principles that have been established for effective learning since the early twentieth century. Students learn when "enjoying themselves" is associated with the law of Effect which states, "learning is strengthened when accompanied by a pleasant or satisfying feeling, and that learning is weakened when associated with an unpleasant feeling." Likewise, the fact that students learn better when currently "engaged in something exciting" is associated with the law of Intensity which states, "a sharp, clear, vivid, dramatic, or exciting learning experience teaches more than a routine or boring experience."

There are other prior systems for presenting educational questions to computer users. However, the known examples suffer from similar deficiencies. For example, Bannwolf (US 2008-0182232) discloses a system that operates "to interrupt or prevent usage of the computer for a computer-based leisure activity, and to provide data to the child client user computer to display an educational task which must be completed as a prerequisite to receiving control of the computer needed to initiate or resume the computer-based leisure activity." (abstract). Thus, Bannwolf also completely interrupts the leisure activity ("upon completion . . . , the child's computer is enabled to initiate or return to interrupted leisure activity." See [0012]).

Falcon (US 2009-0202968) also presents the user with a "pop question" in an "interrupting window." Falcon discloses a system in which "media is interrupted by educational media comprising a question that is subsequently answered by a user." (abstract). Falcon, like Yuen and Bannwolf, also operates by interrupting the user's entertainment media.

There remains a need, therefore, for a system and related method of integrating the educational media into the entertainment media without interrupting the entertainment media. In other words, there remains a need for a system and related method of presenting educational media where interacting with the educational material carries with it the learning advantages of positive connotation and conforms with the established laws of learning in this manner.

SUMMARY OF THE INVENTION

In the first aspect, a computer-implemented method of integrating a succession of educational questions into ongoing entertainment media that is being presented to a student on a display is disclosed. The method comprises the steps of a. identifying a target process associated with an ongoing entertainment media, b. injecting an educational library into the target process, c. receiving an image of a first educational question, and d. overlaying the image of the first educational question over the ongoing entertainment media, the first educational question overlay and the ongoing entertainment media being separately executed. The method further comprises e. initially positioning the first educational question overlay in an unimportant area of the ongoing entertainment media, the unimportant area of the ongoing entertainment media being an area where the student would not naturally focus their attention, f. providing the student with an available amount of time to correctly answer the first educational question, and g. moving the first educational question overlay from the unimportant area of the ongoing entertainment media to an important area of the ongoing entertainment media if the available amount of time has run out, the important area of the ongoing entertainment media being an area where the student would naturally focus their attention.

In a first preferred embodiment, injecting an educational library into a target process further comprises the steps of allocating memory in the target process, writing instructions in the allocated memory in the target process to load an educational library, and creating and executing a remote thread in the educational library to process the instructions in the allocated memory. The overlaying the image of the first educational question over the ongoing entertainment media is preferably performed in a sub-window of the ongoing entertainment media. The overlaying the image of the first educational question over the ongoing entertainment media is preferably performed in an overlay of the ongoing entertainment media. The overlaying the image of the first educational question over the ongoing entertainment media is preferably performed in ongoing entertainment media occupying the entire screen of a display.

The method preferably further comprises adding time to the available amount of time for a second educational question if the student correctly answers the first educational question. The method preferably further comprises preventing the student from moving the educational question overlay away from the important area of the ongoing entertainment media if the available amount of time has run out. The method preferably further comprises increasing the size of the educational question overlay as time passes. The step of increasing the size of the educational question overlay as time passes preferably begins after moving the educational question overlay to an important area of the ongoing entertainment media. The step of increasing the size of the educational question overlay preferably occurs smoothly over time. The step of increasing the size of the educational question overlay preferably occurs in successive abrupt steps.

The method preferably further comprises the steps of moving the educational question overlay from the important area of the ongoing entertainment media back to the unimportant area of the ongoing entertainment media if the student correctly answers the educational question, obtaining a second educational question, and repeating steps a to g for the second educational question. The unimportant area of the ongoing entertainment media is preferably substantially along a perimeter of the ongoing entertainment media. The method preferably further comprises the steps of allowing the student to move the educational question overlay while there is a remaining amount of time so that the student may choose the unimportant area.

In a second aspect, a computer-implemented method of integrating a succession of educational questions into ongoing entertainment media that is being presented to the student on a display is disclosed. The method comprises the steps of: a. identifying a target process associated with an ongoing entertainment media, b. injecting an educational library into the target process, c. receiving an image of a first educational question, and d. overlaying the image of the first educational question over the ongoing entertainment media, the first educational question overlay and the ongoing entertainment media being separately executed where the ongoing entertainment media can be interacted with at all times by the student and continues running at all times while the first educational question overlay changes location or other display state, the first educational question overlay being at least initially semi-transparent such that the ongoing entertainment media is visible through the first educational question overlay. The method further comprises the steps of e. initially positioning the first educational question overlay in an unimportant area of the ongoing entertainment media, the unimportant area of the ongoing entertainment media being an area where the student would not naturally focus their attention, f. providing the student with an available amount of time to correctly answer the first educational question, and g. moving the first educational question overlay from the unimportant area of the ongoing entertainment media to an important area of the ongoing entertainment media if the available amount of time has run out, the important area of the ongoing entertainment media being an area where the student would naturally focus their attention.

In a second preferred embodiment, injecting an educational library into a target process further comprises the steps of allocating memory in the target process, writing instructions in the allocated memory in the target process to load an educational library, and, creating and executing a remote thread in the educational library to process the instructions in the allocated memory. Overlaying the image of the first educational question over the ongoing entertainment media is preferably performed in a sub-window of the ongoing entertainment media. The overlaying the image of the first educational question over the ongoing entertainment media is preferably performed in an overlay of the ongoing entertainment media. The overlaying the image of the first educational question over the ongoing entertainment media is preferably performed in ongoing entertainment media occupying the entire screen of a display.

In a third aspect, a computer-implemented method of integrating a succession of educational questions, for eventual review and response by a student, into ongoing entertainment media that is being presented to the student on a display is disclosed. The method comprises the steps of a. providing a database of educational questions and answers, b. identifying a target process associated with an ongoing entertainment media, c. injecting an educational library into the target process, d. receiving an image of a first educational question, and e. overlaying the image of the first educational question over the ongoing entertainment media, the first educational question overlay and the ongoing entertainment media being separately executed where the ongoing entertainment media can be interacted with at all times by the student and continues running at all times while the first educational question overlay changes location or other display state, the first educational question overlay being at least initially semi-transparent such that the ongoing entertainment media is visible through the first educational question overlay. The method further comprises the steps of: f. presenting a first educational question from the database to the student for answering by the student in an educational question overlay that is located in front of the ongoing entertainment media, the educational question overlay and the ongoing entertainment media being separately executed where the ongoing entertainment media can be interacted with at all times by the student and continues running at all times while the educational question overlay changes location or other display state, the educational question overlay being at least initially semi-transparent such that the ongoing entertainment media is visible through the educational question overlay, g. initially positioning the educational question overlay in an unimportant area of the ongoing entertainment media, the unimportant area of the ongoing entertainment media being an area where the student would not naturally focus their attention, h. providing the student with an available amount of time to correctly answer the first educational question, i. determining if the student correctly answered the first educational question, j. adding time to the available amount of time for a second educational question if the student correctly answers the first educational question, k. moving the educational question overlay from the unimportant area of the ongoing entertainment media to an important area of the ongoing entertainment media if the available amount of time has run out, the important area of the ongoing entertainment media being an area where the student would naturally focus their attention, and l. increasing the size and decreasing the transparency of the educational question overlay as time passes.

In a third preferred embodiment, the method further comprises the step of displaying a remaining portion of the available amount of time to correctly answer the first educational question. The method preferably further comprises the step of displaying an answer to the question if the student incorrectly answers the question.

These and other features and advantages of the invention will become more apparent with a description of preferred embodiments in reference to the associated drawings.

DESCRIPTION OF THE DRAWINGS

FIG. 8 shows the educational interface 30 after a third predetermined period of time (e.g. an additional 15 seconds) has elapsed since FIG. 7. Now, the timer 21 shows −0:45 and the interface 30 is more opaque.

FIG. 9 shows an example educational interface, after an additional 15 seconds has passed since FIG. 8 for a full minute since the first period of time elapsed. The timer 21 shows −1:00. Now the interface 30 has grown to maximum size, is totally opaque, and is obscuring an important center area of the screen.

DETAILED DESCRIPTION OF THE PREFERRED EMBODIMENTS

The following detailed description contains many specifics for the purposes of illustration, but anyone of ordinary skill in the art will appreciate that many variations and alterations to the following details are within the scope of the invention. Accordingly, the following embodiments of the invention are set forth without any loss of generality to, and without imposing limitations upon the claimed invention.

The prior art systems for inserting an education question into entertainment media inherently gave the educational material a negative connotation because the educational material interrupted the entertainment media, creating an environment which violates two of the laws of learning. This invention, by contrast, is premised on the positive learning environment which is created when currently enjoying entertainment media. This is done by initially presenting the question in a relatively unimportant area and thus encouraging the student to answer the question in this area. If the student does not answer the question in the unimportant area, then the question moves to an important area and, preferably, by also starting small and highly transparent and then growing larger and more opaque. The changes can be stepwise or smooth. The entertainment never stops. The student also chooses, on their own, when to answer the question.

The goal of this invention is effectively integrate learning into the time that a student spends enjoying entertainment media. This is particularly useful in a home with student-age children. This novel approach meets the kids where they are, and helps parents and educators alike solve the dilemma between wanting kids to have fun and wanting kids to learn.

Figure 1:
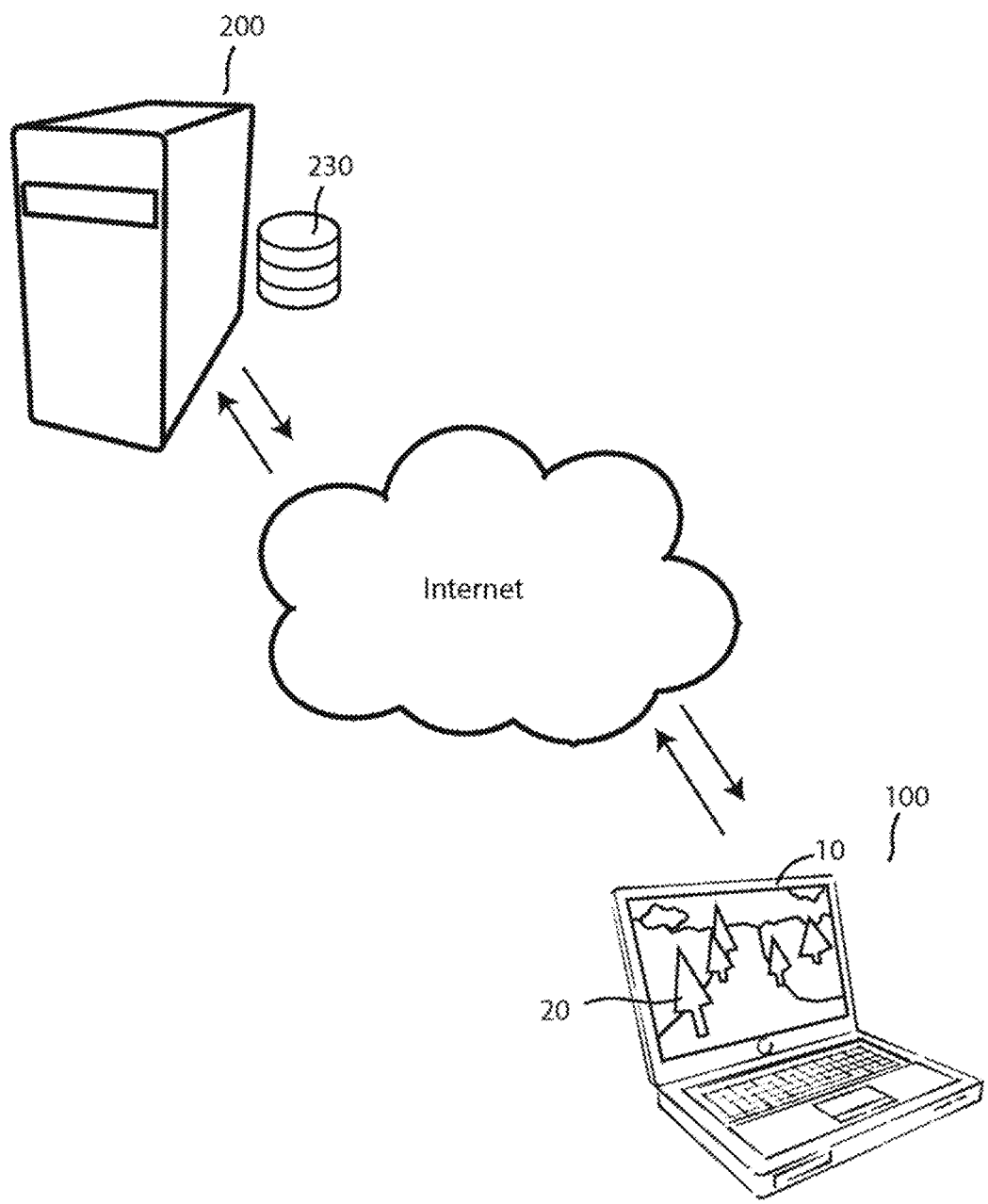
FIG. 1 shows an exemplary implementation of first preferred embodiment where a computer 100 having a display 10 (e.g. a monitor) is used by a student to enjoy some entertainment media 20 (e.g. a video game, streaming video, etc.), the computer 100 connected to a server 200 via the internet.

FIG. 1 shows an exemplary context for a first preferred embodiment where a computer 100 having a display 10 is available for use by a student to enjoy some entertainment media 20 (e.g. a video game, streaming video, social media, etc.). The computer 100 contains the typical components necessary to run the entertainment media and an educational overlay program, including a microprocessor, non-volatile memory for storing programs and related data, random-access memory for executing the programs, etc.

Here, the computer 100 is connected to a server 200 via the internet or other suitable network. In this preferred case, the server 200 includes a database 230 that contains the educational material (questions) that are preferably pre-selected by a parent or educator, but the internet connection is optional. In an alternative embodiment, the computer 100 could be a standalone computer and the question pool could come from local data. Moreover, the illustration of a computer 100 is merely an example in that the same approach could be taken on any other electronic device capable of displaying entertainment media.

Figure 2:
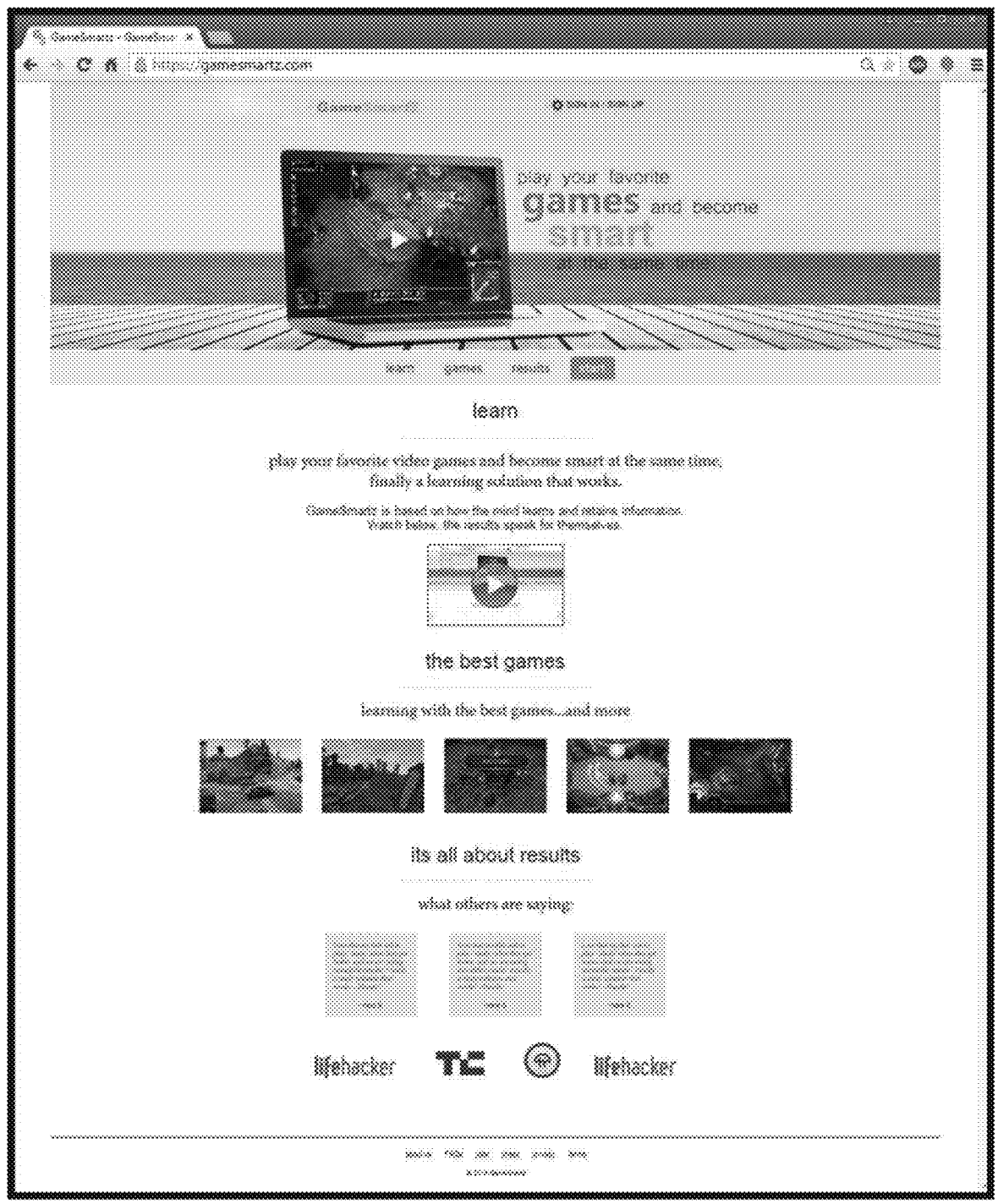
FIG. 2 shows an exemplary web page associated with a first preferred embodiment where an educator or parent can register an account and download an educational overlay program that, when run on the computer 100, interacts with the server 200 to display educational overlays on the entertainment media 20 and, preferably, also to store data regarding usage statistics for later review.

FIG. 2 shows an exemplary web page associated with a first preferred embodiment where an educator or parent can register an account and download an educational overlay program that, when run on the computer 100, interacts with the server 200 to display educational overlays on the entertainment media 20 and, preferably, also to store data regarding usage statistics for later review. In practice, the parent or educator would sign up for an account, download an educational overlay program that runs on the computer 100, and sign in to their account within the educational overlay program so that the program retrieves the parent-selected questions from the server 200 and transmits data regarding the student's usage to the server 200. The website and downloadable program could be implemented with any desired web tools and programming languages, all of which are well within the ability of typical programmers, so the details are omitted for the sake of brevity.

This invention integrates educational learning with popular entertainment media 20 via an overlay 30 containing an educational question. There are numerous possible embodiments. In the preferred embodiment, the overlay 30 containing the educational question is initially presented in an unimportant area of the entertainment media 20, and the student is encouraged to answer the questions in this area. If the student incorrectly answers the question or does not try to answer it, the question moves to an important area of the entertainment media 20. Examples of popular entertainment media include, but are not limited to, video games, movies, TV or any media the user deems entertaining. For example, web based activities, social media, videos, and more. The media options are only limited to what the student deems as entertaining.

This invention involves the important observation that there are "important" area and "unimportant" areas in any given entertainment media 20. For purposes of this patent application, an "unimportant area" is defined as an area where the user's attention is not normally drawn while interacting with the entertainment media 20.

An unimportant area, most typically, would be a non-central area that is off to the side. In the presently preferred embodiment, the unimportant area is located within the entertainment media 20 itself, even when it is being displayed in a window and not in fullscreen mode, but it could be further removed from the entertainment media 20 by being outside of the entertainment media 20 and/or near the very edge of the overall display 10 if the entertainment media 20 is running in a window that is smaller than the overall display 10.

An "important area," by contrast, refers to an area within the entertainment media 20 where the user's attention is normally drawn while interacting with the entertainment media 20. An important area, most typically, would simply be the center of the entertainment media 20, but it could also be a control area (e.g. over controls that are used to move around) or a data entry area (e.g. a field used to type messages in a social media program) or any other area the user would normally be focusing on.

The applicant's unique system does not interrupt the underlying entertainment media 20. This invention uses an overlay technique to effectively integrate the educational questions into the entertainment media 20 and without interrupting the entertainment media 20. There is a true integration—even though the two programs are separately executed—in the sense that the underlying media 20 can be interacted with at all times and continues running at all times while the educational overlay 30 changes location and/or other display state.

In the preferred embodiment, in addition to starting in an unimportant area, the overlay 30 also starts in a small and semi-transparent state so that the entertainment media 20 easily shows through. If the student does not try to answer the question or does not answer a question correctly, the overlay 30 moves to an important area of the entertainment media 20. That way, the question gains importance. However, the students are encouraged to answer the questions correctly while the questions are in an unimportant area. This being the case, the questions will always remain in the unimportant area, as the available time will never expire.

For purposes of this application, an overlay refers to a computer-generated display element that lies in "front" of, or on "top" of other computer-generated display content. Understanding an overlay, and generating and changing the display state (content, position, size, transparency, etc.) of an overlay is well within the purview of ordinary programmers and need not be described in detail.

As some background, however, one well known overlay technique is called software hooking. In computer programming, software hooking, covers a range of techniques used to alter or augment the behavior of an operating system, of applications, or of other software components by intercepting function calls or messages or events passed between software components. Code that handles such intercepted function calls, events or messages is called a "hook". This technique is widely used in benchmarking programs or frame rate measuring in 3D games, where the output and input is done through hooking. An overlay can be accomplished with this technique.

Overlays can also be implemented in computer programming as a form on top of another form. In component based programming, a form is a representation of a GUI window. In this context, a semi-transparent form on top of another form functions as an overlay.

However, as stated before, the above are merely examples and any desired techniques can be used to achieve the same effect.

First Preferred Embodiment—Implementation

Learning is largely a psychological endeavor. The preferred embodiment, therefore, is best understood by reviewing the technical implementation as shown in the accompanying figures, followed by a discussion of the psychological merits of these novel methods.

FIGS. 1 to 8 illustrate a number of screens for a first preferred embodiment. This embodiment works by having the student initiate the educational overlay program (not shown) in parallel with the initiation of their entertainment media 20. Preferably, before the student starts the educational overlay program, they are encouraged to watch a short yet instructive video on what they will be learning. The video goes over why the subject is important and relevant to their lives, as well as comparing the current subject with any similar subject they have already successfully learned.

Figure 3:
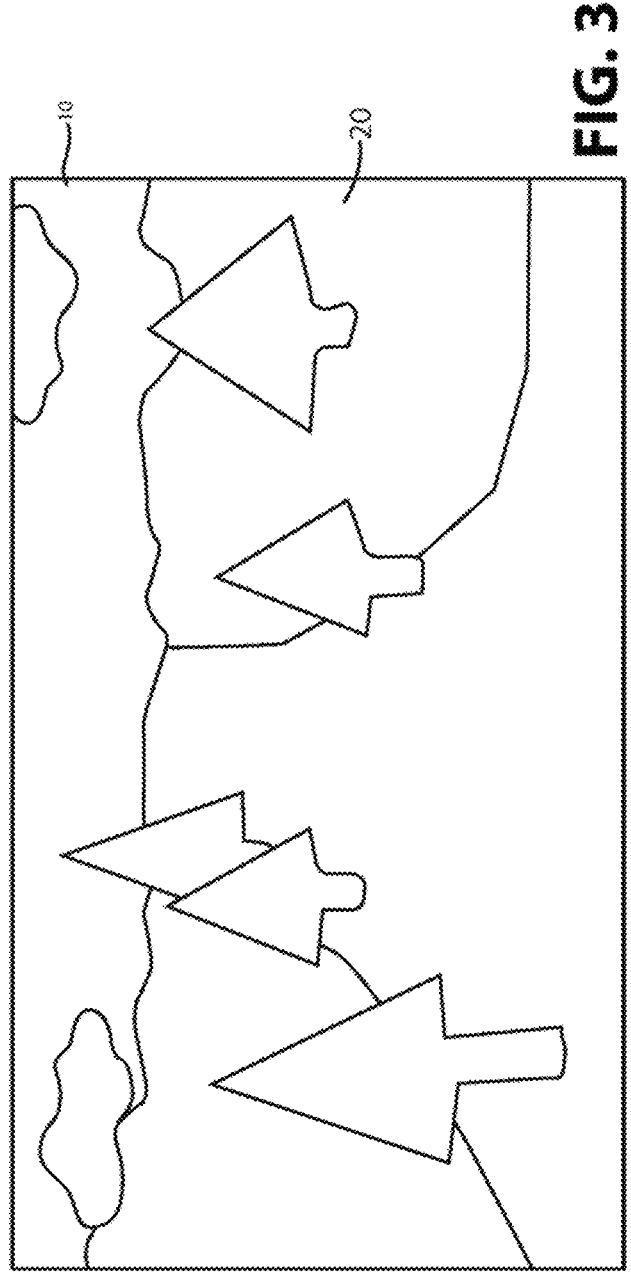
FIG. 3 shows the display 10 from FIG. 1 containing some exemplary entertainment media 20 (e.g. a video game)
Figure 4:
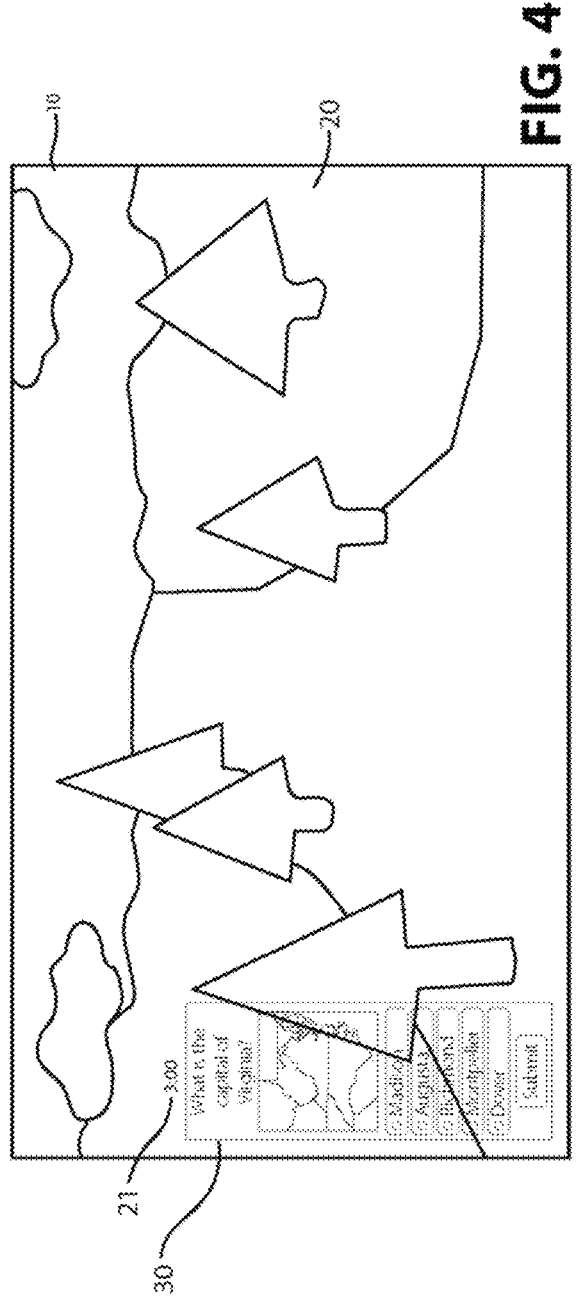
FIG. 4 shows a first preferred embodiment of an educational overlay 30 integrated into the lower left hand corner of the display 10. The educational overlay 30 contains educational questions and is initially presented in an unimportant area off to the side and in a small size and in a semi-transparent, low opacity state, as suggested by its lighter lines and the fact that the video game 20 elements are visible through its elements. When the overlay 30 is first presented, the remaining time 21 to answer the question is 3:00.

FIG. 3 shows what the student sees after they started their chosen entertainment 20. FIG. 4 shows what the student sees after they have also started the educational overlay program that displays the educational overlay 30. At this initial time, the educational overlay 30 is located in an unimportant area of the entertainment media 20 (here, the lower left hand corner). Moreover, the educational overlay 30 is relatively small in size and semi-transparent so that the entertainment media 20, which continues to run, is easily visible through the overlay 30.

In this particular example, the educational overlay 30 is displaying a graphic along with a text-based multiple choice question, but the overlay 30 could display any number of question types including, for example, an audio based spelling test that provides a fill-in-the-blank answer box, a mathematical question that solicits a numeric answer, etc. The format of the question is entirely up to the designers.

In this embodiment, the educational overlay 30 also includes a timer 21 located above the question. The timer 21 could count up or down, but preferably counts down so that the student sees how much time is remaining at a glance. The timer 21 is constantly counting down and displaying the student's remaining time to address the question presented or else have the overlay 30 change state to take on more importance. Here, the timer 21 shows a countdown time of "3:00", indicating to the student that he has a full three minutes to answer the question before the overlay 30 changes state.

Figure 5:
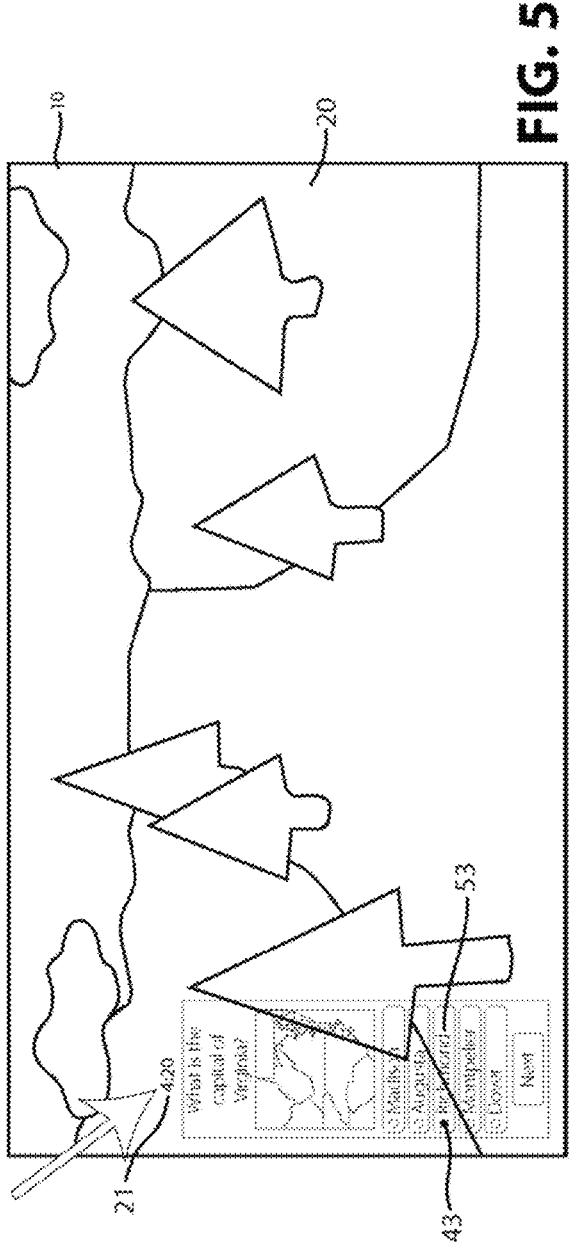
FIG. 5 shows the educational overlay 30 after the question in the overlay 30 has been answered correctly through the user's designation 43 of the correct answer 53. The student is preferably rewarded with more time for a correct answer. In this example, after ten second had already elapsed, one minute and thirty seconds was added to the student's available time and the timer 21 shows that the student's total remaining time has been increased to 4:20.

FIG. 5 shows how the student gets more time for a subsequent question if during the initially allotted time the student tries to answer the first question and gets the answer correct. Here, after only ten seconds, the student selected button 43 to choose the correct answer 53 ("Richmond"). In this particular embodiment, the student is awarded with the additional time of one minute and thirty seconds (e.g. 1:30). In FIG. 5, therefore, the timer 21 now displays 4:20 because the student took 0:10 seconds to answer correctly (3:00–0:10=2:50, and 2:50+1:30=4:20).

Figure 6:
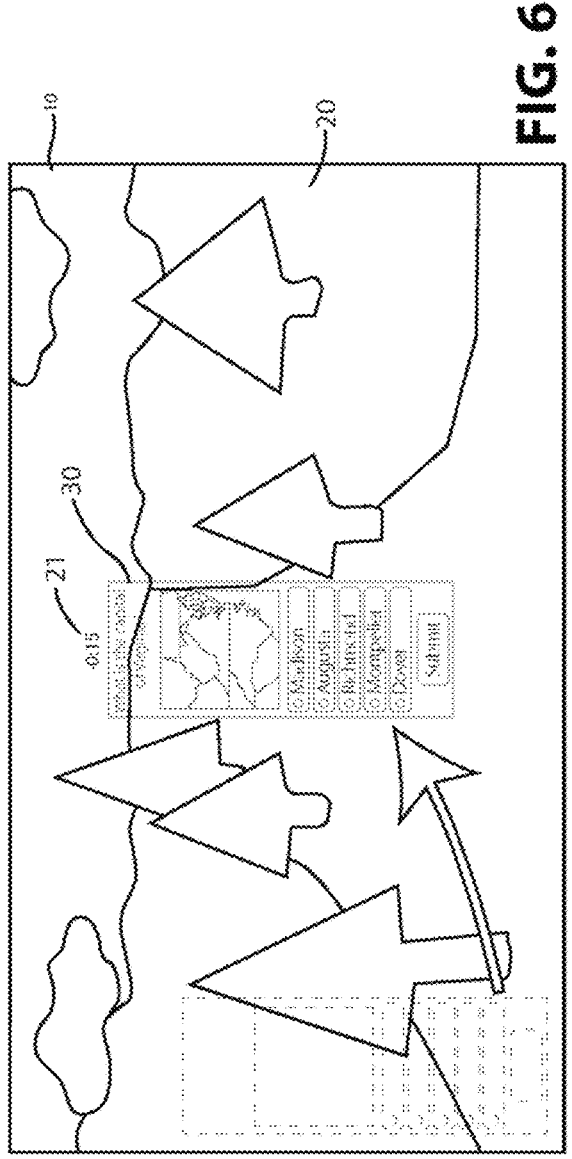
FIG. 6 shows the educational overlay 30 moved to an important center area of the screen 10, but is still small in size and in a semi-transparent, low opacity state, after a first predetermined period of time has lapsed (e.g. the after the expiration of the 4:20 minutes shown in FIG. 5). In this example, the timer 21 displays a negative number showing that 15 additional seconds have passed since the first period of time has lapsed.

FIG. 6 shows what happens if the timer 21 runs out before the student tries to answer the question or the student tries but does not answer a question correctly. In either case, the educational overlay 30 moves to an important area of the entertainment media 20 (here the center of the screen) and grows moderately in size.

In the currently preferred embodiment, the timer 21 changes from a countdown timer to a count-up timer and shows a negative number to remind the student how much time has passed since they permitted the overlay 30 to move to the important area. In other embodiments, especially one where the overlay 30 changes state in increments rather than gradually over time, it may be desirable to continue using a countdown timer 21 or a progress bar timer, so that the student knows at a glance how much time remains before the overlay 30 changes state again.

Figure 7:
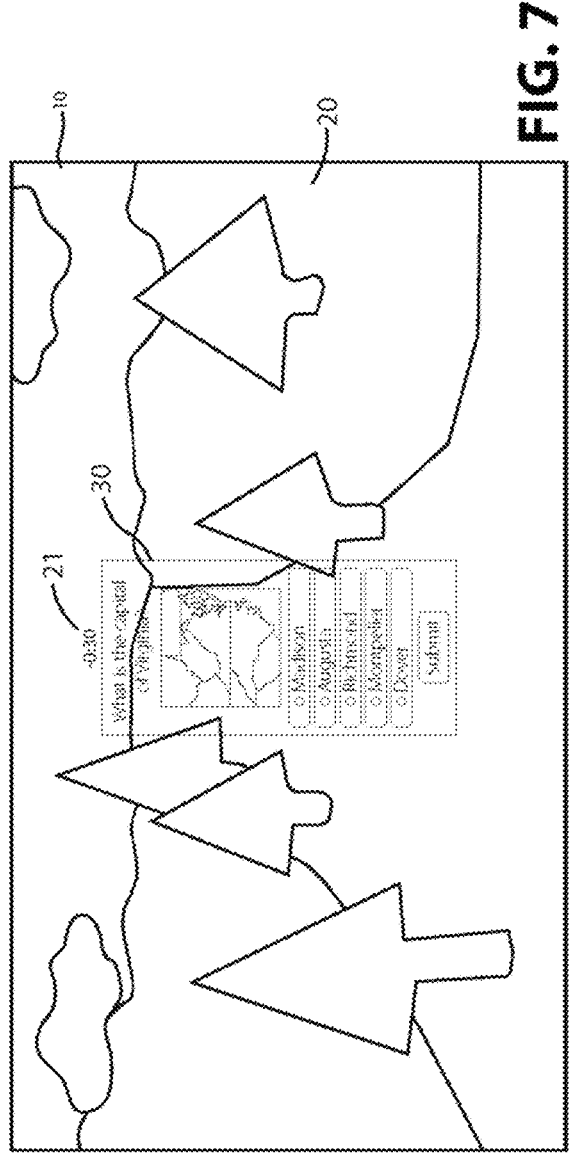
FIG. 7 shows the educational overlay 30 increased in size to obscure an even larger portion of the screen after a second predetermined period of time (e.g. an additional 15 seconds) has elapsed since FIG. 6. Now, the timer 21 shows −0:30.

FIG. 7 shows what the student sees if he permits an additional 15 seconds to run without answering the question correctly. In particular, as shown, the educational overlay 30 continues to grow in size. This increase in size could occur smoothly and continuously from –0:15 to –0:30, or it could occur in one jump at –0:30.

FIG. 8 shows what the student sees if another 15 seconds pass without a correct answer. In particular, the educational overlay 30 has continued to grow in size and has also become less transparent or, equivalently speaking, more opaque. Stated another way, the overlay 30 has come to take on more importance.

FIG. 9, lastly, shows what the student sees if he permits yet another 15 seconds to pass without a correct answer. The timer 21 now shows –1:00 and the educational overlay 30 has grown to an even larger size and is now completely opaque. By this time, much of the entertainment media 20 is covered by the overlay 30 and it becomes difficult to enjoy the entertainment without answering the question correctly.

Of significance, if the student correctly answers the question at any point, the overlay 30 resumes it original place at the unimportant side of the screen and the student gets additional time, basically as shown in FIG. 4, but with a new question. It should be said that preferably the time available the student to answer the question in the unimportant area never needs to run out. The student can strategically answer the questions in this area before time runs out and is encouraged to do so. The overlay never needs to leave this area, unless temporarily, to show the correct answer if the student answers a question wrong, as shown in (FIG. 10).

Figure 10:
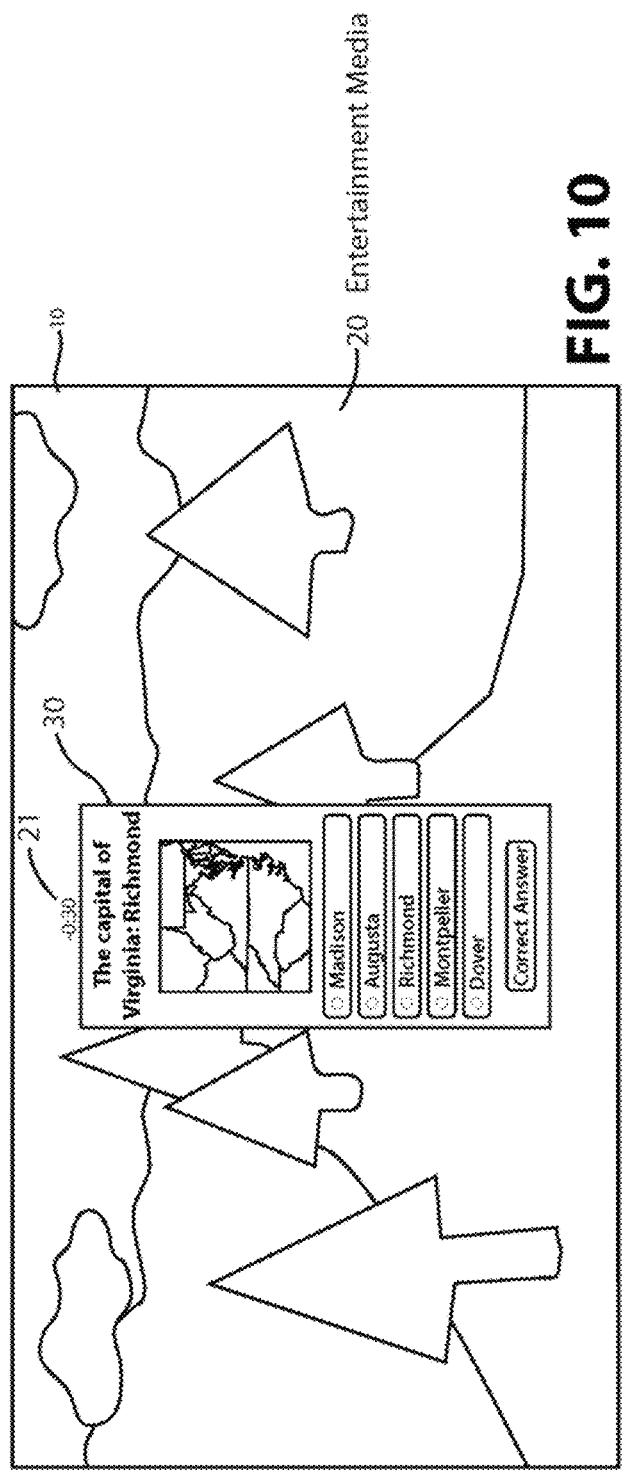
FIG. 10 shows an example educational interface 30 after a question has been answered incorrectly. The correct answer completely obscures the center of the screen for a temporary amount of time.

If the student gets the answer wrong, then the correct answer is shown in the important middle of the screen for a temporary, fixed amount of time, e.g. 7 seconds, as shown in (FIG. 10). Showing the educational overlay in this way teaches the correct answer, while at the same time discourages incorrect answers or guessing.

Figure 11:
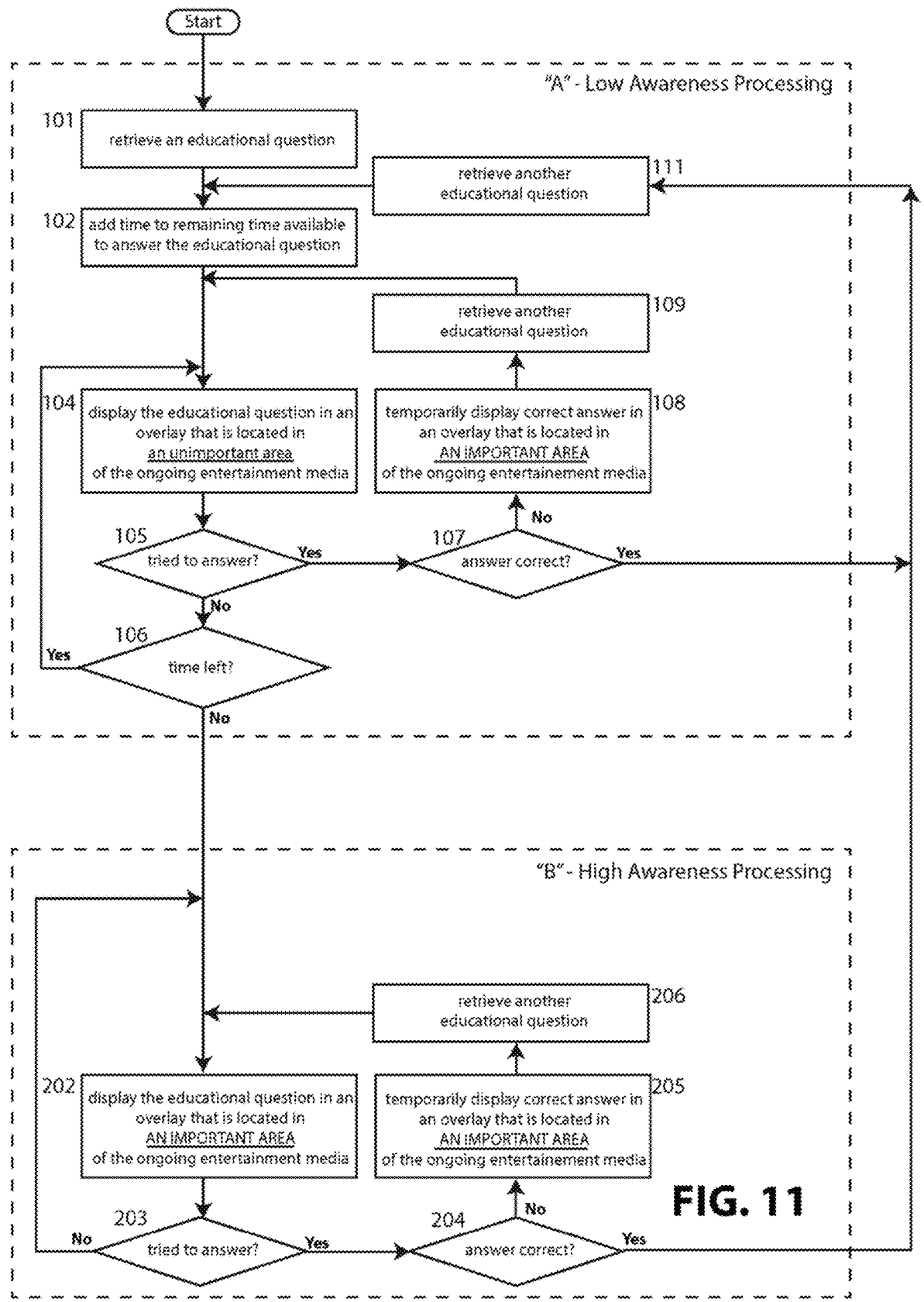
FIG. 11 is a flow chart showing the processing for a first embodiment including the steps of displaying the educational questions in an unimportant area of the ongoing entertainment media and, if time runs out, displaying the educational question, correct answer, and subsequent question(s) in an important area of the ongoing entertainment media until the user correctly answers an educational question.

FIG. 11 is a flow chart showing the processing for a first embodiment including the steps of displaying the educational questions in an unimportant area of the ongoing entertainment media and, if time runs out, displaying the educational question, correct answer, and subsequent question(s) in an important area of the ongoing entertainment media until the user correctly answers an educational question. As shown, the processing can be mentally divided into two portions, a low awareness portion "A" where the overlay 30 containing the educational questions is located in an unimportant area of the ongoing entertainment (at least so long as the student correctly answers the questions), and a high awareness portion "B" where the overlay is moved to an important area of the ongoing entertainment until the student correctly answers a question presented in the now prominently located overlay.

Low Awareness Processing—At step 101, the system retrieves an educational question which, in the preferred embodiment, is stored in a database 230 on a remote server 200 (see FIG. 1). At step 102, the system adds time for the educational question (e.g. 1:30 minutes) to the available time remaining, and if any, from prior questions. At step 104, the system displays the educational question in an overlay 30 that is located in an unimportant area of the going entertainment media 20. At step 105, the system determines whether the student has tried to answer. If the student tried to answer at step 105, the system then determines at step 107 whether the answer is correct.

If the student answer was correct, then processing returns to step 111, essentially retrieving another question. If the student answer was incorrect, however, at step 108 the system temporarily displays the correct answer for a certain amount of time, e.g. for 7 seconds, thereby penalizing the student somewhat for not knowing the answer and presenting the correct answer for their consideration in getting it right the next time that question appears. In the presently preferred system, the correct answer is displayed in an overlay that is located in an IMPORTANT area of the ongoing entertainment media, making it especially important to the student to get the answer right in the first place, but the correct answer could be displayed in the unimportant area instead so that the perceived penalty is somewhat lower. At step 109, the system retrieves another educational question, and processing repeats at step 104. In other words, even though the student did not answer the first question correctly and the correct answer was displayed in the important area of the screen in step 108, the new question is once again displayed in the unimportant area because there is still time remaining.

If the student did not try to answer at step 105, then at step 106 processing simply loops back to continue displaying the overlay 30 and its related question in the unimportant area. However, if at step 106 it is determined that no further time is left, then somewhat to the students chagrin, processing continues with the steps in the high awareness processing section below.

High Awareness Processing—At step 202, with time expired, the system displays the educational question in an overlay that is located in an important area of the ongoing entertainment media. Basically, the system moves the overlay 30 from the unimportant area to the important area. This could occur abruptly, or with an animation effect. In either case, however, the overlay 30 will be located in an important area that now makes the educational question take on increased importance for the student because it is located in an area that makes it more challenging to effectively interact with the ongoing entertainment media 30.

At step 203, the system determines whether the student has tried to answer. If the student tried to answer at step 203, the system then determines at step 204 whether the answer is correct. If the student answer was correct, then processing returns to step 111, (adds to the available time) and the system retrieves another question and to the student's benefit, displays it in the low awareness, unimportant area, and the and the student is able to interact more effectively with the entertainment.

If the student answer was incorrect, however, at step 205, the system temporarily displays the correct answer in the same important area for a predetermined amount of time and then, at step 206, retrieves another educational question that continues, at step 202, to be displayed in the important area (e.g. the center of the screen.)

If the student did not try to answer at step 203, then processing simply loops back to continue displaying the overlay 30 and its related question in the important area. In other words, the only way for the student to get the overlay back to the unimportant area of the screen is to try to answer the question and to do so correctly.

Figure 12:
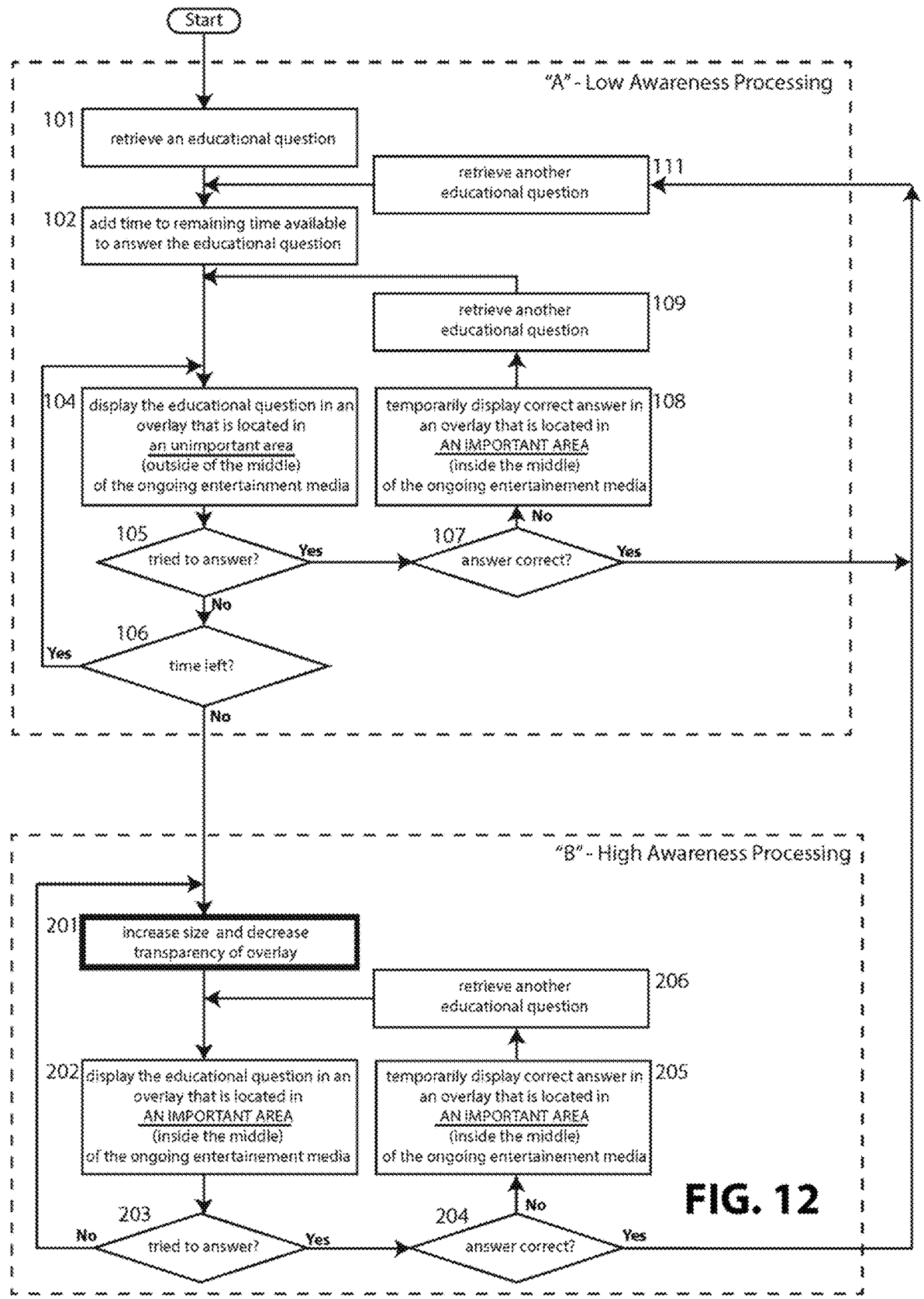
FIG. 12 is a flow chart showing a second, presently preferred embodiment that is similar to FIG. 11, but further provides 201 for increasing the size and decreasing the transparency of the overlay containing the questions after the questions are displayed in the important area of the ongoing entertainment media.

FIG. 12 is a flow chart showing a second, presently preferred embodiment that is similar to FIG. 11. However additionally, the overlay containing the questions increases in size and decreases in transparency 201 after the questions are displayed in the important area of the ongoing entertainment media.

The underlying dynamic is that the student is required to answer questions correctly in order to earn additional time. However, there is a sweet spot to the parameters associated with this dynamic. If the student is required to answer questions too frequently, and if not enough additional time is given for a correct answer, then the student spends too much of their time answering the educational questions. This dynamic can destroy the student's enjoyment of the entertainment. This in turn destroys the entire learning process when the student most likely quits in frustration. If, on the other hand, the student is awarded too much time, for example 20 additional minutes per question correct, the questions are spaced so far apart that the learning has become largely ineffective.

The system may also limit how much bonus time a student can get in total from answering the questions correctly. For example, the student may be limited to a 5:00 minute maximum. If the student correctly answers four questions in a row, awarding 1:30 seconds each, they would be awarded a total of 6:00. However, since there is a 5:00 minute maximum, the timer would cap out at 5:00 minutes. This forces the student to space out the questions throughout the time they are interacting with the media, instead of cramming through them upfront, all at once. Spacing out the questions, to some degree, also creates a more effective learning environment which is described in detail below.

First Preferred Embodiment—Potential Modifications

The system encouraging learning continues in the general manner outlined above, with the student getting more time as they answer questions correctly. This continues until all the questions have been answered correctly and repeatedly, i.e. until all of the questions have been mastered. What constitutes mastery can differ for different subjects. For example, a geography question might be considered mastered if it was answered correctly four times in a row, but a mathematical question might be considered mastered only after the student has correctly answered fifteen different questions of the same type but with different numbers. Either way, the student has proven they can answer all of the questions correctly without error.

To assist the learning process, a question can be asked with increasing intervals. This facilitates the student first answering the question from short-term memory then from long-term memory. For example, if a student is asked a question and answers it correctly, two other question are asked before the same question is asked again. Since the student answered the question correctly just moments earlier, this tests the student's short-term memory.

After the student proves they can answer the question from short-term memory, the question is shown at increasing intervals. For example, this time, seven questions may be asked before the question is asked again. This stretches the students short-term memory toward a long-term memory.

If the student gets the question correct again, the question is shown after an even longer interval. For example, fourteen questions may be asked before the student is asked the question yet again. This further stretches the students memory, and so on.

If at any point, the student gets the question incorrect, it can be assumed they have not learned the material sufficiently for long-term memory. Because of this, the student starts over, again testing for short-term memory. In this case, like originally, only two questions are asked before the student is asked the same question again. In this way, if the student answers a question incorrectly, they start over again, testing for short-term memory and slowly building up to long-term memory as described above.

Preferably, when a question is mastered, it is dropped from the available questions and not asked again. Over time this makes the learning process more focused as questions already known are dropped out of the pool of available questions. This continues until the student masters all questions in the test.

At this point the student can continue learning with the next test. To allow for continuous learning, the tests can be added to a queue before the learning starts. In this example the queue is a list of subjects and, after one subject is completed, the next subject starts. This allows the student to continue learning for hours, one test of their or their parents' choice after another.

However, since the purpose of the invention is to integrate educational questions into popular entertainment in the most effective manner, it is possible to adjust any or all of parameters we have discussed above such as timing, question location, maximum times, awarded times, opacity, transparency, how things are obscured, what is obscured, where things are obscured, at what time things are obscured, the type of questions asked, etc. Any of these parameters can be adjusted based on data collected from the students, or adjusted in real-time based on real-time feedback.

As adjustments are made, the incoming data from the students can be analyzed to see the if the change creates a more effective learning environment. Also, since much of effective learning is psychological, changes can be made based on student feedback and observation. For example, it might make itself evident than obscuring a different part of the screen, in a different way, with less transparency and more of a blur, increases student participation in a more effective manner. As another example, after observing student behavior, it is determined that awarding less time per correct answer, but additional bonuses for numerous questions correct in a row enhances students participation and results. As another example, it may be determined that a student who is getting the majority of their questions wrong is simply guessing, and increasing the time the correct answer is shown in the important area of the screen as shown in FIG. 10, effectively discourages this. As yet another example, after analyzing student results, it might be determined that adjusting how many times the student needs to answer the question correctly is calculated on a per question basis, based on how difficult the question has been to learn for other students, in combination with the current student's past performance. As yet another example, it may be determined that for particular subjects a fill-in-the-blank question yields the best results. As yet another example, it may be determined that an audio question for a spelling test yields the best results. As is evident, almost an endless combination of adjustments can be made with what is obscured, time, opacity, movement, and questions, all of which can be changed to increase effectiveness and all are within the scope of what is possible with this invention.

Also, in an system of this type, there is the potential problem of the student stopping or shutting down the educational overlay program and, thus, removing the educational overlay 30. Programmatic efforts could be taken to inhibit this sort of action, but experience shows that students can override these sorts of limitations, and are often more savvy than their parents/educators when it comes to manipulating computers. To counter this, and also help parents/educators keep track of student progress, the preferred system's server 200, via a suitable web interface, emails, etc., provides the parents with a report after the student has answered their last question. For example, if a student starts learning, but then shuts down the learning interface after just ten minutes, after an amount of time has passed, a report is sent to the responsible parent/educator. This report shows what questions were answered, when the questions were answered, and the results of those questions. This data can be shown in a number of ways including multiple, easy to read graphical representations. For example, by quickly looking at the report the parent/educator can see that the student answered their first question at 3:00 PM, a couple more questions thereafter, and the last question at 3:10 PM. This would show that the student only studied for ten minutes. When presented with this information, the responsible parent/educator can then take appropriate actions to make sure this does not happen in the future, for example, limiting access to the entertainment if this pattern of shutting down the educational overlay continues. This method ultimately put the responsibility of continuing to learn on the students.

First Preferred Embodiment—Principles of Effective Learning

The first preferred embodiment is effective because effective learning is largely a psychological endeavor and it closely utilizes successful learning principles.

Educational psychologists and pedagogues have identified several principles of effective learning, also known as laws of learning. These principles have been discovered, tested, and used in practical situations since the early twentieth century. They provide insight into what helps students learn most effectively. These well established laws are the laws of: Readiness, Exercise, Effect, Primacy, Recency, Intensity, Freedom and Requirement. This invention is effective as a learning tool because it utilizes all of these laws in some way.

Readiness, the law of readiness implies a degree of concentration and eagerness. Individuals learn best when they are physically, mentally, and emotionally ready to learn, and do not learn well if they see no reason for learning. Often, students don't see how the educational material is important to their everyday lives. There is a disconnect between what they think is important to them everyday, and the educational material being taught. On the other hand, students do see how their favorite video game or other entertainment media is important to them. This invention integrates into the student's chosen entertainment in a way which some of the importance the student places on the entertainment is transferred to the educational material. For example, if the student is playing a video game in which they deem important and they get the question wrong, the correct answer will show in an important area of the game screen for 7 seconds, as shown in (FIG. 10). All of a sudden, from the student's point of view, what did not seem important before, the educational material, has become important. As now learning the educational material affects the outcome of their 'important' game. As the law states, this additional importance given to the educational material is part of an effective learning environment.

Exercise, the law of exercise states that those things most often repeated are best remembered. It is the basis of drill and practice. It has been proven that students learn best and retain information longer when they have meaningful practice and repetition. While the student is enjoying their entertainment, game, social media etc, they can study for hours at a time. This allows more than ample time to drill and practice. As the law states, this ample time of repeatedly seeing the questions over and over is part of an effective learning environment.

Effect, the principle of effect is based on the emotional reaction of the student. It has a direct relationship to motivation. The principle of effect is that learning is strengthened when accompanied by a pleasant or satisfying feeling, and that learning is weakened when associated with an unpleasant feeling. The student will strive to continue doing what provides a pleasant effect to continue learning. By integrating the educational material into a pleasurable environment, the educational material is now accompanied by a pleasant or satisfying feeling. As the law states, this is part of an effective learning environment.

Primacy, the state of being first, often creates a strong, almost unshakable, impression. Things learned first create a strong impression in the mind that is difficult to erase. This principle is utilized in this invention with immediate feedback. Traditionally when learning, if the student misinterprets or gets a question wrong, they don't know this until much later, when the test is graded, etc. Whereas by that time the principle of primacy assures the incorrect answer is much harder to remove from the students mind. However, this invention gives immediate feedback, whereas the incorrect answer is not given any time to make a negative impression that later needs to be removed. As the law states this is part of an effective learning environment.

Regency, the principle of recency states that things most recently learned are best remembered. Conversely, the further a student is removed timewise from a new fact or understanding, the more difficult it is to remember. Information acquired last generally is remembered best. In this invention questions are presented firstly at close intervals and then later at farther and farther intervals as explained in the preceding. When the questions are shown at close intervals, as discussed in the preceding, the questions utilize the principle of recency as facts easier to remember when they were recently seen. As the law states this is part of an effective learning environment.

Intensity, the principle of intensity states that the more intense the material taught, the more likely it will be retained. A sharp, clear, vivid, dramatic, or exciting learning experience teaches more than a routine or boring experience. Traditionally when learning, educational material can be perceived as routine or boring by the student. This invention provides the exact opposite learning environment. The educational material is always taught in an environment in which the student is alert and paying attention, the opposite state of mind than bored or routine. As the law states this is part of an effective learning environment.

Freedom, the principle of freedom states that things freely learned are best learned. Conversely, the further a student is coerced, the more difficult is for them to learn, assimilate and implement what is learned. Because the student gets to choose when to answer the questions, and additionally choose their favorite entertainment, this conforms to the law of Freedom. As the law states this is part of an effective learning environment.

Requirement, the law of requirement states that "we must have something, to obtain or do something." It can be an ability, skill, instrument or anything that may help us to learn or gain something. A starting point or root is needed. This invention provides this root or foundation of understanding with a short but effective learning video. The video goes over why the upcoming information is important to the students lives and what they have already learned successfully in the past which is similar. As the law states, students already having this foundation or root before learning is part of an effective learning environment.

In summary, since effective learning is largely a psychological endeavor and this invention combines all these well known laws which have been discovered, tested, and used in practical situations since the early twentieth century. The end result is an very effective learning tool which meets the current generation of students where they are. This tool is equally beneficial to students and parents and educators. By combining the laws of learning in this way an effective learning tool is created, helping students learn while also allowing parents/educators to let the students enjoy entertainment media knowing it is beneficial for the students to do so.

However, it will be clear to one skilled in the art that the above embodiments may be altered in many ways without departing from the scope of the invention. Accordingly, the scope of the invention should be determined by the following claims and their legal equivalents.

Many modifications can be made without departing from the spirit and scope of the claimed invention.

However, although software hooking and overlays have been around since early versions of windows and does not need to be re-described, the way these embodiments use the hook to present educational questions within games and apps is unique and has never been done before. How specifically we have modified and added to this technology is described in the preferred technological embodiments below.

Figure 13:
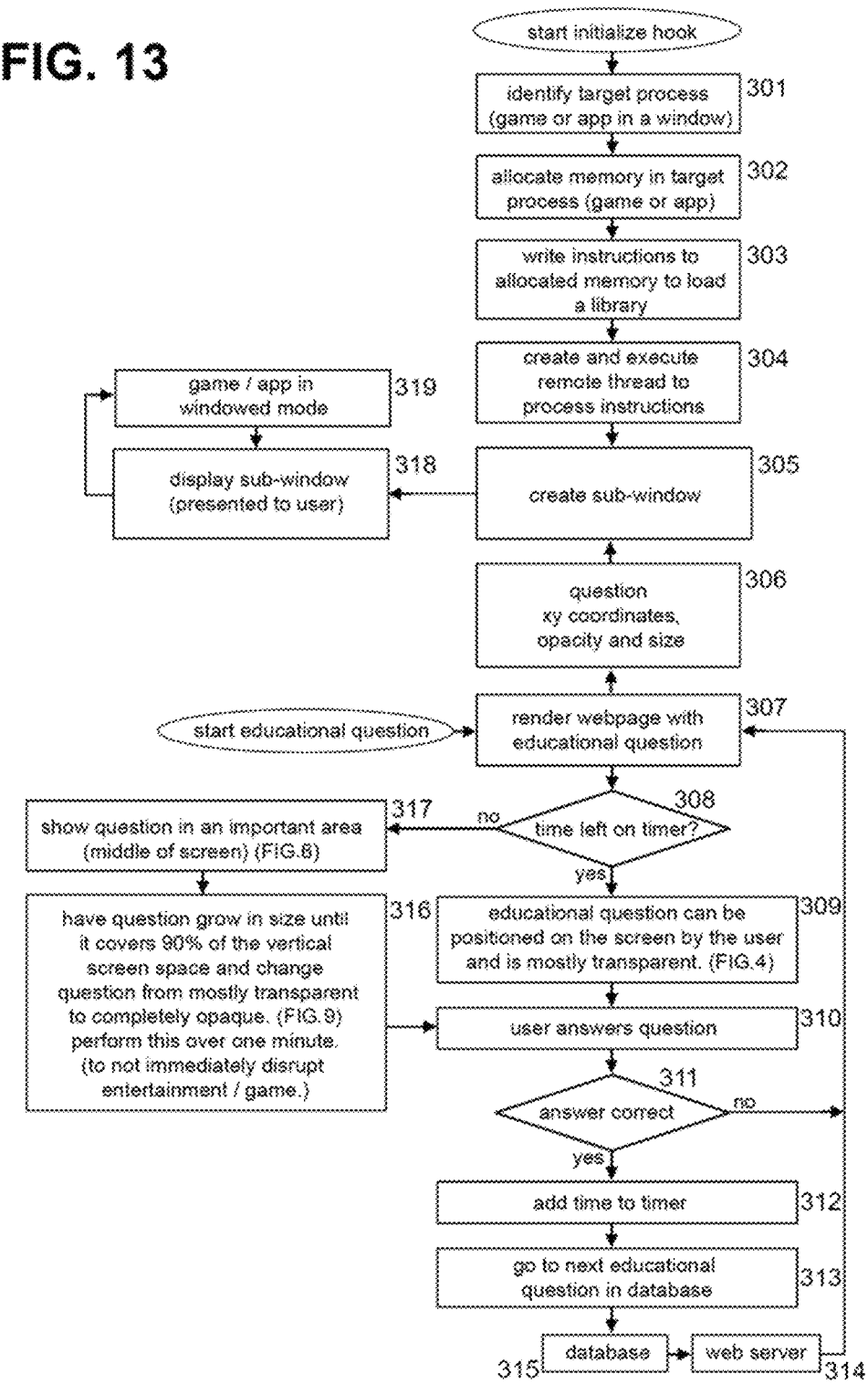
FIG. 13 is a flow chart of a process for overlaying educational questions over a game or app in a window environment.
Figure 14:
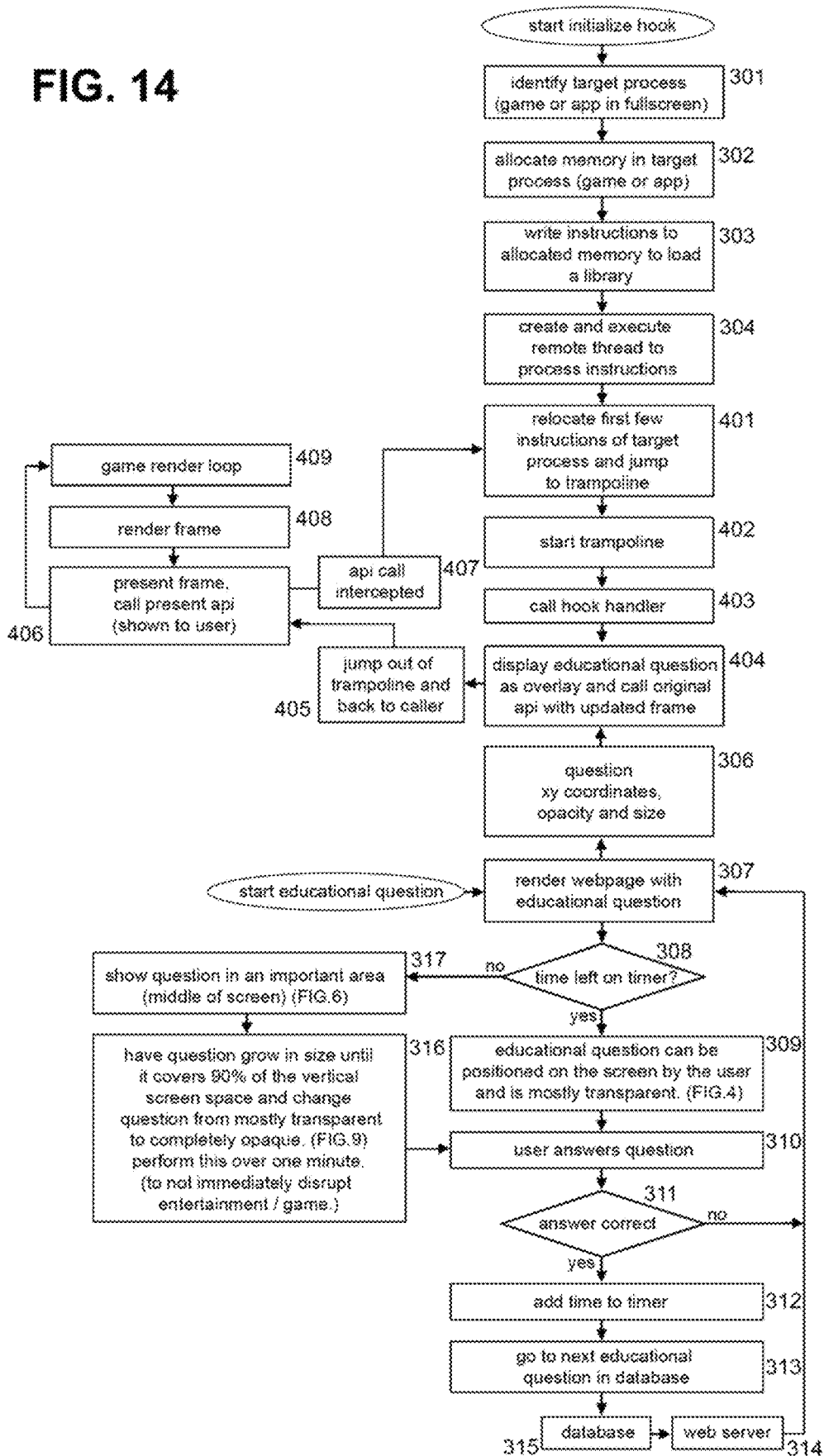
FIG. 14 is a flow chart of a process for overlaying educational questions over a game or app in a fullscreen environment.

One or more embodiments uses two different technological embodiments for hooking. The embodiment used depends on the game or app being targeted. The main differentiator is, games or apps being run in a window use the embodiment shown in (FIG. 13). While games and apps being run in fullscreen mode use the embodiment shown in (FIG. 14). The reason two different embodiments are necessary is the embodiment used for windowed games and apps, is not compatible with games and apps in fullscreen mode. Also the embodiment used for fullscreen mode is likely to work in situations where windowed mode will not because of a deeper integration. The embodiment shown in (FIG. 13) will be called the "windowed embodiment". Whereas the embodiment shown in (FIG. 14) will be called the "fullscreen embodiment". Both embodiments start by using a library injection, also known as dynamic link library or "DLL" injection. The library injection runs code within the address space of the target process and forces it to load a dynamic-link library. Further details are outlined below.

In the "windowed embodiment" we start by initializing the hooking software (FIG. 13). Next, the software identifies the target process, by iterating the currently running processes and allowing the user to select one (Step 301). In this windowed embodiment, we let the user select the target process (game or app) by clicking on it. Following targeting the process (game or app) we start the steps to inject a DLL into it. (Steps 302-304).

The DLL we are injecting is one that ultimately displays a webpage showing educational questions. This is the output of (Step 307). We will call this the "educational DLL". The first step in hooking is allocating memory in the target process (game or app), this is shown in (Step 302). Second, we write instructions in this newly allocated memory to load the educational DLL (Step 303). Third we create and execute a remote thread to process these instructions (Step 304). At this point the educational DLL has successfully been injected into the target process (game or app).

Next we initialize a child window within the target process so that it is a true child of the main window of that application (Step 305). Next, since we have now created a window as a child of the game or application's main window we can easily show this as a sub-window on top of the main game or app with transparency (Step 318). An example of this child window when first loaded can be seen in (FIG. 4). We can also move this sub-window window around via xy coordinates or scale the window over time, seen in (FIGS. 4-10).

Two specific embodiments on how this sub-window moves and changes transparency in response to user inputs are shown in both (FIGS. 11 & 12). A more general embodiment of this movement, while also shown in how it works in conjunction with the hook and the web server is shown in (FIG. 13).

As shown in FIG. 13, the process of starting to initialize the hook begins by identifying a target process such as a game or app in a window (step 301). Memory is allocated in the target process such as the game or app (step 302). Instructions are written to the allocated memory to load a library (step 303). A remote thread is created and executed to process instructions (step 304). A sub-window is created (step 305).

To start the educational question, the webpage is rendered with an educational question (step 307). A timer is checked to determine if time is left (step 308). If time is remaining, the educational question can be positioned on the screen by the user and is mostly transparent as shown in FIG. 4 (step 309). The user answers the question (step 310) which is checked to determine if the answer is correct (step 311).

If the answer is correct, time is added to the timer (step 312) and the process goes to the next educational question in the question database (step 313). The database is accessed (step 315) which is presented to the web server (step 314), and the process returns to the rendering of the webpage with the educational question (step 307).

If the answer is not correct, the process returns to rendering of the webpage with the educational question (step 307).

If there is no remaining on the timer, the question is shown in an important area of the screen such as the middle screen as shown in FIG. 6 (step 317). The question grows in size until the question covers 90% of the vertical screen space and changes the question from mostly transparent to completely opaque (FIG. 9) and performs this over one minute (to not immediately disrupt the entertainment or game) (step 306). The process then waits for the user to answer the question (step 310).

After rendering the webpage with an educational question (step 307), the question xy coordinates, opacity, and size (step 306) is sent to the sub-process of creating a sub-window (step 305). A sub-window is displayed or presented to the user (step 318) in a game or app in windowed mode (step 319).

The second embodiment, the "fullscreen embodiment" is generally used for full screen games and apps, shown in (FIG. 14). This embodiment starts off identical to the windowed embodiment, in steps 302-304. First the software identifies the target process by iterating the currently running processes and selecting the correct one (Step 301). In the full screen embodiment, the next application run after starting the hooking software is targeted. Next we start the steps to inject a library, the educational DLL into the target game or app (Steps 302-304). These steps are identical to the steps in the windowed embodiment. The first step is allocating memory in the target process (Step 302). Second, we write instructions in this allocated memory to load the educational DLL (Step 303). Third we create and execute a remote thread to process instructions (Step 304). At this point the educational DLL has been successfully injected into the target game or app.

Next, the full screen embodiment deviates from the windowed embodiment at step 401. In this step, after the educational DLL is injected, we relocate the "first few instructions" of the appropriate API ("Application Program Interface") functions used by the target process (game or app (i.e., application)) into a "trampoline". We replace the "first few instructions" with a jump to the start of the trampoline instead (Step 401). The trampoline, in this example, refers to the process of modifying the start of a target (game or app) API function so that it instead jumps to another function where the behavior of the function can be changed. When the new behavior is complete the function jumps back to the original. In this step an API hook is created so that we are able to modify the behavior of common rendering APIs, for example, Direct3D and OpenGL present frame, used in full screen games and apps.

Next, when the original API method is intercepted, the code in the trampoline is executed in order to call the educational DLL API hook handler. (Step 403). When the educational DLL API hook handler is called, we hand over control from the target app to the educational DLL (Step 403). In the educational DLL we perform the processes starting at step 307.

In the next step we display the educational DLL as an overlay and call the original api with an updated frame. The educational DLL code takes an image of the educational DLL and renders this onto the game's next frame. The original API method is then called so that normal operation continues and the frame is displayed onto the screen (Step 404).

Next, we jump out of trampoline and back to caller. This is where the trampoline finalizes the call and returns to the original caller, as shown in (Step 405).

Finally, we show the result to the user and call present frame, which calls present api. This is where the target game or app rendering engine presents a frame for display to the screen (Step 406). Different APIs are used depending upon the underlying technology, Direct3D or OpenGL for example. This step is what is displayed to the user. An example of the final result of what the user would see is shown in (FIGS. 4-10).

Similar to the windowed embodiment, two specific embodiments on how this overlay moves around the screen and changes transparency in response to user inputs are shown in both (FIGS. 11 & 12). A more general embodiment of this movement, while also shown in conjunction with the hooking process and the web server is shown in (FIG. 14).

As shown in FIG. 14, the process of starting to initialize the hook begins by identifying a target process such as a game or app in a window (step 301). Memory is allocated in the target process such as the game or app (step 302). Instructions are written to the allocated memory to load a library (step 303). A remote thread is created and executed to process instructions (step 304). The first few instructions are relocated of the target process and jump to trampoline (step 401). The trampoline is started (step 402) and the hook handler is called (step 403). The educational question is displayed as an overlay and the original api is called with updated frame (step 404).

To start the educational question, the webpage is rendered with an educational question (step 307). A timer is checked to determine if time is remaining (step 308). If time is remaining, the educational question can be positioned on the screen by the user and is mostly transparent as shown in FIG. 4 (step 309). The user answers the question (step 310) which is checked to determine if the answer is correct (step 311).

If the answer is correct, time is added to the timer (step 312) and the process goes to the next educational question in the question database (step 313). The database is accessed (step 315) which is presented to the web server (step 314), and then returns to the rendering of the webpage with the educational question (step 307).

If the answer is not correct, the process returns to rendering of the webpage with the educational question (step 307).

If time is not left on the timer, the question is shown in and important area of the screen such as the middle screen as shown in FIG. 6 (step 317). The question grows in size until the question covers 90% of the vertical screen space and changes the question from mostly transparent to completely opaque (FIG. 9) and performs this over one minute (to not immediately disrupt the entertainment or game) (step 316). The process then waits for the user to answer the question (step 310).

After rendering the webpage with an educational question (step 307), the question xy coordinates, opacity, and size (step 306) is sent to the sub-process of displaying educational question as an overlay and call original api with updated frame (404). The process jumps out of trampoline and back to caller (step 405).

The game render loop (step 409) renders the frame (step 408) and presents the frame call api (shown to user) (step 406). The api call is intercepted (step 407) and returns to the step of relocating first few instructions of target process and jump to trampoline (step 401).

In both the above technological embodiments, we take a technology which is known but rarely used, hooking, and have modified it in a unique and specific way which pushes computer technology forward. This technology was added to and modified in this specific way, in the embodiments above, with the goal of solving an important problem (education). However, although the two above technological embodiments are best practices, it will be clear to one skilled in the art that the above embodiments may be altered in many ways without departing from the scope of the invention.

Although the invention has been discussed with reference to specific embodiments, it is apparent and should be understood that the concept can be otherwise embodied to achieve the advantages discussed. The preferred embodiments above have been described primarily as educational questions overlaying an entertainment media. In this regard, the foregoing description of the overlay is presented for purposes of illustration and description. It shall be apparent that various forms of media other than educational questions would benefit from being overlaid with a second media.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

Unless specifically stated otherwise, it shall be understood that disclosure employing the terms "processing," "computing," "allocating," "jumping," and others refer to a data processing system or other electronic device manipulating or transforming data within the device memories or controllers into other data within the system memories or registers.

One or more embodiments may be implemented in computer software firmware, hardware, digital electronic circuitry, and computer program products which may be one or more modules of computer instructions encoded on a computer readable medium for execution by or to control the operation of a data processing system. The computer readable medium may be a machine readable storage substrate, flash memory, hybrid types of memory, a memory device, a machine readable storage device, random access memory ("RAM"), read-only memory ("ROM"), a magnetic medium such as a hard-drive or floppy disk, an optical medium such as a CD-ROM or a DVR, or in combination for example. A computer readable medium may reside in or within a single computer program product such as a CD, a hard-drive, or computer system, or may reside within different computer program products within a system or network. The computer readable medium can store software programs that are executable by the processor and may include operating systems, applications, and related program code. The machine readable non-transitory medium storing executable program instructions which, when executed, will cause a data processing system to perform the methods described herein. When applicable, the ordering of the various steps described herein may be changed, combined into composite steps, or separated into sub-steps to provide the features described herein.

Computer programs such as a program, software, software application, code, or script may be written in any computer programming language including conventional technologies, object oriented technologies, interpreted or compiled languages, and can be a module, component, or function. Computer programs may be executed in one or more processors or computer systems.

What is claimed is:

1. A computer-implemented method of integrating a succession of educational questions into ongoing entertainment media that is being presented to a student on a display, the method comprising the steps of:
  a. identifying a target process associated with an ongoing entertainment media;
  b. injecting an educational library that includes the educational questions into the target process comprising the steps of:
    allocating memory in the target process;
    writing instructions in the allocated memory in the target process to load the educational library; and,
    creating and executing a remote thread in the educational library to process the instructions in the allocated memory to render images of the educational questions;
  c. receiving an image of a first educational question rendered by the remote thread created and executed by the injecting step;
  d. overlaying the image of the first educational question rendered by the remote thread created and executed by the injecting step over the ongoing entertainment media, the first educational question overlay and the ongoing entertainment media being separately executed;
  e. initially positioning the first educational question overlay in an unimportant area of the ongoing entertainment media, the unimportant area of the ongoing entertainment media being an area where the student would not naturally focus their attention;
  f. providing the student with an available amount of time to correctly answer the first educational question; and,
  g. moving the first educational question overlay from the unimportant area of the ongoing entertainment media to an important area of the ongoing entertainment media if the available amount of time has run out, the important area of the ongoing entertainment media being an area where the student would naturally focus their attention.

2. The method of claim 1, wherein the educational library comprises a dynamic-link library ("DLL.

3. The method of claim 1, wherein overlaying the image of the first educational question over the ongoing entertainment media is performed in a sub-window of the ongoing entertainment media.

4. The method of claim 1, wherein overlaying the image of the first educational question over the ongoing entertainment media is performed in an overlay of the ongoing entertainment media.

5. The method of claim 1, wherein overlaying the image of the first educational question over the ongoing entertainment media is performed in ongoing entertainment media occupying the entire screen of a display.

6. The method of claim 1 further comprising the step of:
adding time to the available amount of time for a second educational question if the student correctly answers the first educational question.

7. The method of claim 1 further comprising the step of:
preventing the student from moving the educational question overlay away from the important area of the ongoing entertainment media if the available amount of time has run out.

8. The method of claim 1 further comprising the step of:
increasing the size of the educational question overlay as time passes.

9. The method of claim 8 wherein the step of increasing the size of the educational question overlay as time passes begins after moving the educational question overlay to an important area of the ongoing entertainment media.

10. The method of claim 8 wherein the step of increasing the size of the educational question overlay occurs smoothly over time.

11. The method of claim 8 wherein the step of increasing the size of the educational question overlay occurs in successive abrupt steps.

12. The method of claim 1 further comprising the steps of:
moving the educational question overlay from the important area of the ongoing entertainment media back to the unimportant area of the ongoing entertainment media if the student correctly answers the educational question;
obtaining a second educational question; and
repeating steps a to g for the second educational question.

13. The method of claim 1 wherein the unimportant area of the ongoing entertainment media is substantially along a perimeter of the ongoing entertainment media.

14. The method of claim 1 further comprising the steps of:
allowing the student to move the educational question overlay while there is a remaining amount of time so that the student may choose the unimportant area.

\* \* \* \* \*